(12) United States Patent
Morgan et al.

(10) Patent No.: US 10,830,069 B2
(45) Date of Patent: Nov. 10, 2020

(54) PRESSURE-LOADED SEALS (71) Applicant: General Electric Company, Schenectady, NY (US)

(72) Inventors: Victor John Morgan, Simpsonville, SC (US); Jesse Ellis Barton, Fountain Inn, SC (US); Richard Martin DiCintio, Simpsonville, SC (US); Kevin Thomas McGovern, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 15/275,570

(22) Filed: Sep. 26, 2016

(65) Prior Publication Data
US 2018/0087390 A1 Mar. 29, 2018

(51) Int. Cl.
F01D 9/02 (2006.01)
F02C 3/04 (2006.01)
F16J 15/08 (2006.01)

(52) U.S. Cl.
CPC ............... F01D 9/023 (2013.01); F02C 3/04 (2013.01); F16J 15/0887 (2013.01); F05D 2220/32 (2013.01); F05D 2240/128 (2013.01); F05D 2240/35 (2013.01); F05D 2260/52 (2013.01)

(58) Field of Classification Search
CPC ...... F01D 9/023; F01D 11/001; F01D 11/005; F02C 3/04; F02C 7/28; F16J 15/00; F16J 15/0887; F05D 2220/32; F05D 2240/128; F05D 2240/35; F05D 2260/52; F04D 29/083
USPC .......................................................... 60/805
See application file for complete search history.

(56) References Cited

U.S. PATENT DOCUMENTS

| 5,265,412 | A | 11/1993 | Bagepalli et al. |
| 5,797,723 | A | 8/1998 | Frost et al. |
| 5,987,879 | A | 11/1999 | Ono |
| 6,347,508 | B1 | 2/2002 | Smallwood et al. |
| 6,431,555 | B1 * | 8/2002 | Schroder ............... F01D 11/005 277/628 |
| 6,450,762 | B1 | 9/2002 | Munshi |
| 6,547,257 | B2 | 4/2003 | Cromer |

(Continued)

FOREIGN PATENT DOCUMENTS

| EP | 2 592 232 A2 | 5/2013 |
| EP | 2 871 326 A1 | 5/2015 |

(Continued)

OTHER PUBLICATIONS

Extended European Search Report and Opinion issued in connection with corresponding EP Application No. 17191950.9 dated Jan. 26, 2018.

Primary Examiner — Jesse S Bogue
Assistant Examiner — Loren C Edwards
(74) Attorney, Agent, or Firm — Dority & Manning, P.A.

(57) ABSTRACT

A sealing arrangement for sealing between a stage-one nozzle and an aft frame includes a seal comprising a flexible sealing element. The flexible sealing element includes an intermediate portion, a first outer portion on one side of the intermediate portion, and a second outer portion on the other side of the intermediate portion. The intermediate portion is mechanically loaded against the first stage nozzle and the aft frame, and the first outer portion and the second outer portion are pressure-loaded against the aft frame and the stage-one nozzle.

20 Claims, 6 Drawing Sheets

(56) References Cited

U.S. PATENT DOCUMENTS

| | | |
|---|---|---|
| 6,588,214 B2 | 7/2003 | Mack et al. |
| 6,834,507 B2 | 12/2004 | Jorgensen |
| 7,481,037 B2 | 1/2009 | Takaya et al. |
| 7,784,264 B2 | 8/2010 | Weaver et al. |
| 7,797,948 B2 | 9/2010 | Weaver et al. |
| 7,908,866 B2 | 3/2011 | Kato et al. |
| 8,141,879 B2 | 3/2012 | Venkataraman et al. |
| 8,562,000 B2 | 10/2013 | Moehrle et al. |
| 8,661,828 B2 | 3/2014 | Pieussergues et al. |
| 8,985,592 B2 | 3/2015 | Green et al. |
| 9,115,585 B2 | 8/2015 | Melton et al. |
| 2003/0123980 A1* | 7/2003 | Mohammed-Fakir ............... F01D 9/041 415/191 |
| 2004/0031271 A1 | 2/2004 | Jorgensen |
| 2006/0123797 A1 | 6/2006 | Zborovsky et al. |
| 2006/0127219 A1 | 6/2006 | Zborovsky |
| 2009/0322036 A1 | 12/2009 | Halling |
| 2011/0020113 A1 | 1/2011 | Beeck |
| 2011/0304104 A1 | 12/2011 | McMahan et al. |
| 2012/0085103 A1 | 4/2012 | Lacy et al. |
| 2012/0200046 A1 | 8/2012 | Green et al. |
| 2012/0280460 A1 | 11/2012 | Cihlar et al. |
| 2013/0111911 A1* | 5/2013 | Flanagan ............... F01D 9/023 60/752 |
| 2013/0161914 A1 | 6/2013 | Sarawate et al. |
| 2014/0366556 A1 | 12/2014 | Banks et al. |
| 2015/0184528 A1 | 7/2015 | Belsom |
| 2017/0342850 A1 | 11/2017 | Morgan et al. |

FOREIGN PATENT DOCUMENTS

| | | |
|---|---|---|
| FR | 2 991 387 A1 | 12/2013 |
| WO | 2013/153322 A1 | 10/2013 |
| WO | 2014/164941 A2 | 10/2014 |

* cited by examiner

FIG. 10

PRESSURE-LOADED SEALS

FIELD OF THE TECHNOLOGY

The subject matter disclosed herein relates to a combustor for a gas turbine. More specifically, the disclosure is directed to a sealing arrangement for the interface of one or more combustor transition ducts with a stage-one nozzle of a gas turbine.

BACKGROUND

Gas turbines typically comprise several interconnected discrete parts. A gas turbine generally includes an inlet section, a compression section, a plurality of combustors, a turbine section, and an exhaust section. The inlet section may include a series of filters, cooling coils, moisture separators, and/or other devices to purify and otherwise condition a working fluid (e.g., air) entering the gas turbine. The working fluid flows downstream from the inlet section to a compressor section where kinetic energy is progressively imparted to the working fluid to produce a compressed working fluid at a highly energized state. The compressed working fluid is mixed with a fuel from a fuel supply to form a combustible mixture within one or more combustors. The combustible mixture is burned to produce combustion gases having a high temperature and pressure. The combustion gases flow through a turbine of a turbine section wherein energy (kinetic and/or thermal) is transferred from the combustion gases to rotor blades, thus causing a shaft to rotate and produce work. For example, the rotation of the turbine shaft may drive the compressor to produce the compressed working fluid. Alternately or in addition, the shaft may connect the turbine to a generator for producing electricity. Exhaust gases from the turbine flow through an exhaust section that connects the turbine to an exhaust stack downstream from the turbine. The exhaust section may include, for example, a heat recovery steam generator for cleaning and extracting additional heat from the exhaust gases prior to release to the environment.

The combustors of a gas turbine are generally coupled to a stage-one nozzle of the turbine section via transition ducts. Typically, each transition duct has an aft frame positioned adjacent to an inlet side of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. Inner and outer circumferential seals are used to seal between the inner and outer portions of the aft frame and the corresponding inlet of the turbine section. Radially oriented side seals can be disposed between adjacent aft frames to substantially close and seal off the circumferential gaps between the side portion of one aft frame and the next aft frame.

The inner and outer seals between the aft frames of the combustors and the stage-one nozzle are typically mounted on one of the aft frame or the stage-one nozzle and mechanically biased into sealing engagement therewith. Such seals may be pressure-biased into sealing engagement with the other of the aft frame or the stage-one nozzle. As a result, there are two different sealing engagements at different axial locations which may enable a chute-leak to bypass the seal. Gas turbines usually burn hydrocarbon fuels and produce air polluting emissions such as oxides of nitrogen (NOx) and carbon monoxide (CO). Thus, a leak bypassing one or more of the inner and outer seals may lead to escape of working fluid (e.g., compressed air and/or combustion gases) flowing through the transition duct from the combustor to the stage-one nozzle, which can cause lower performance and a shift in the emission of air pollutants.

BRIEF DESCRIPTION OF THE TECHNOLOGY

Aspects and advantages are set forth below in the following description, or may be obvious from the description, or may be learned through practice.

Improved sealing connections between the various parts of the gas turbine are desired in the art. In particular, gas turbines and associated sealing arrangements which facilitate a reduction or elimination of working fluid lost to the ambient atmosphere and/or emissions escaping to the ambient atmosphere would be advantageous.

One embodiment of the present disclosure is directed to a sealing arrangement for sealing between a first component and a second component, the sealing arrangement includes a seal comprising a flexible sealing element, the flexible sealing element comprising an intermediate portion, a first outer portion on one side of the intermediate portion, and a second outer portion on the other side of the intermediate portion, wherein the intermediate portion is mechanically loaded against the first stage nozzle and the aft frame, and wherein the first outer portion and the second outer portion are pressure-loaded against the aft frame and the stage-one nozzle.

Another embodiment is directed to a gas turbine. The gas turbine includes a compressor, a turbine, a combustor, a transition duct which defines a flow path from the combustor to a stage-one nozzle of the turbine, the transition duct comprising an upstream end, a downstream end, and an aft frame that circumferentially surrounds the downstream end of the transition duct, and a seal between the aft frame and the stage-one nozzle, the seal comprising a flexible sealing element, the flexible sealing element comprising an intermediate portion, a first outer portion on one side of the intermediate portion, and a second outer portion on the other side of the intermediate portion, wherein the intermediate portion is mechanically biased into sealing engagement with the stage-one nozzle and the aft frame, the first outer portion is configured to sealingly engage with the aft frame under pressure from compressed working fluid produced by the compressor, and the second outer portion is configured to sealingly engage with the stage-one nozzle under pressure from compressed working fluid produced by the compressor.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel to and/or aligned with an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
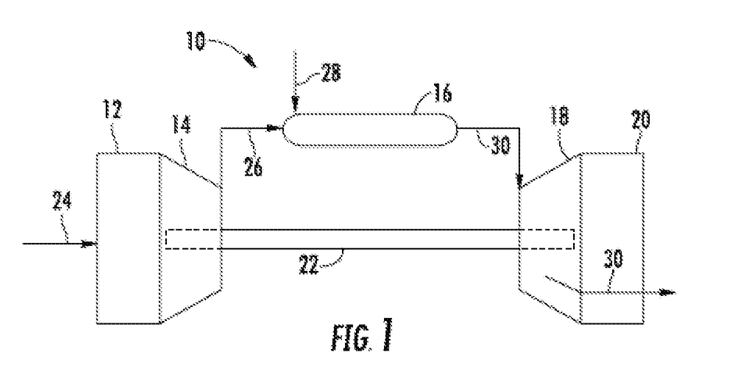
FIG. 1 illustrates a schematic diagram of an exemplary gas turbine that may incorporate various embodiments of the present disclosure.

Referring now to the drawings, FIG. 1 illustrates a schematic diagram of an exemplary gas turbine 10 that may incorporate various embodiments of the present invention. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
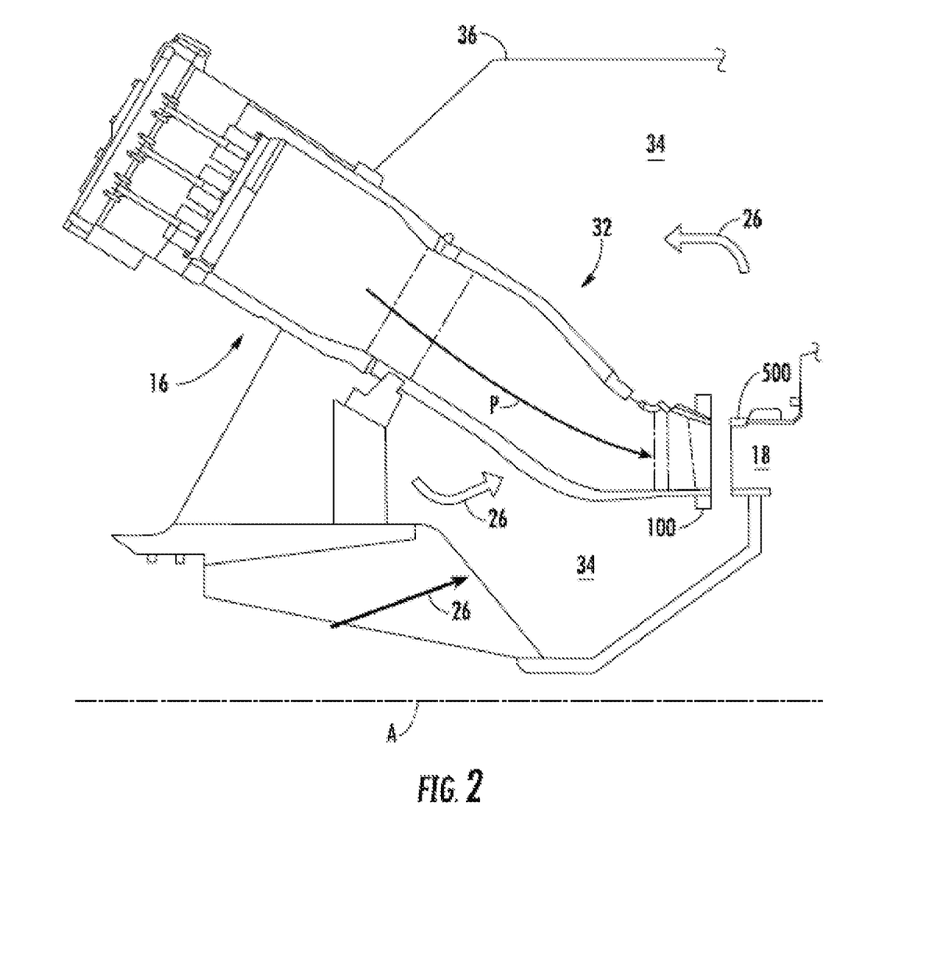
FIG. 2 illustrates a section view of a transition duct between a combustor and a stage-one nozzle according to at least one embodiment.

As shown in FIG. 2, the combustor 16 may be at least partially surrounded by an outer casing 36 such as a compressor discharge casing. The outer casing 36 may at least partially define a high pressure plenum 34 that at least partially surrounds various components of the combustor 16, such as transition duct 32. The high pressure plenum 34 may be in fluid communication with the compressor 14 (FIG. 1) so as to receive the compressed air 26 therefrom. As illustrated in FIG. 2, the combustor 16 may be connected to the stage-one nozzle 500 of turbine 18 via a transition duct 32 including an aft frame 100. The transition duct 32 defines a flow path P. Also shown in FIG. 2 is the central axis A of turbine 18, which defines an axial direction substantially parallel to and/or along axis A, a radial direction perpendicular to axis A, and a circumferential direction extending around axis A.

Figure 3:
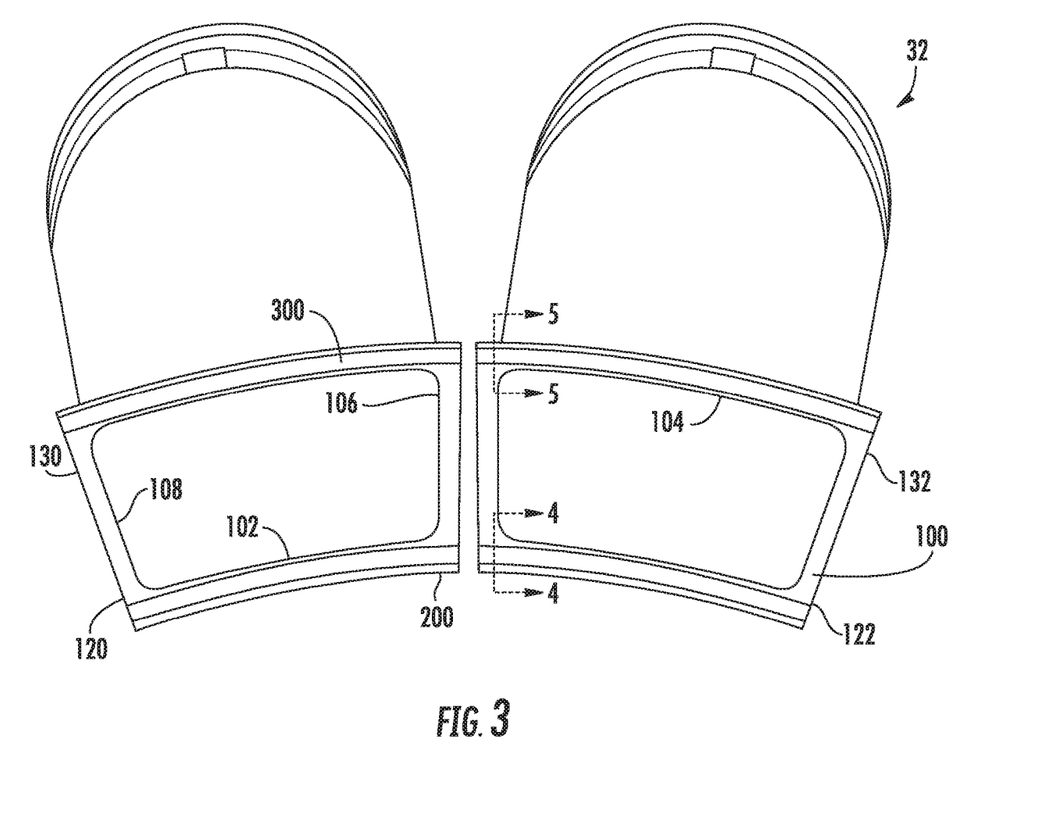
FIG. 3 is a perspective view of circumferentially adjacent aft frames which may incorporate various embodiments of the present disclosure.

Referring now to FIG. 3, a pair of circumferentially arranged transition ducts 32 are illustrated, each having an aft frame 100 that surrounds its respective downstream end. As illustrated in FIG. 3, in some embodiments, the aft frame may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. Aft frame 100 may include a notch or slot 110 (see, e.g., FIGS. 4-10) for receiving inner seal 200 and/or outer seal 300, and in particular a rigid frame 210 or 310, respectively, thereof. In some embodiments, such as those illustrated in FIGS. 4-10, notch 110 may extend fully around the perimeter of the aft frame 100 (e.g., notch 110 may be continuous through the side portions 106 and 108 and the inner and the outer portions 102 and 104) for receiving both inner seal 200 and outer seal 300 as well as a radially-oriented side seal 400 (see, e.g., FIGS. 4 & 10) which may be provided between adjacent aft frames 100, as discussed in more detail below. It is also possible in some embodiments to provide separate slots or notches for each of the seals 200, 300, and 400.

In the exemplary embodiment illustrated in FIG. 3, inner seal 200 and outer seal 300 are circumferentially oriented, each inner seal 200 is circumferentially aligned with the other inner seal 200 on the adjacent aft frame 100, and each outer seal 300 is circumferentially aligned with the other outer seal 300 on the adjacent aft frame 100. Thus, inner seals 200 and outer seals 300 may be collectively referred to as circumferentially-oriented seals. As illustrated in FIG. 3, the aft frame 100 may also include radially-extending side portions 106 and 108, the intersections of side portions 106 and 108 with inner portion 102 define inner corners 120 and 122, and the intersections of side portions 106 and 108 with outer portion 104 define outer corners 130 and 132. A radially oriented side seal 400 (see, e.g., FIGS. 4 and 10) may be disposed between the aft frames 100 and the inner and outer seals 200 and 300 disposed on the aft frames 100.

In the description herein, certain features of the aft frame 100, stage-one nozzle 500, and seals, 200, 300, and 400, will be described with reference to one or the other of inner portion 102/inner seal 200 and outer portion 104/outer seal 300, nonetheless, it will be recognized by one of ordinary skill in the art that such features can be associated with either or both of inner portions 102 and/or outer portions 104.

Figure 4:
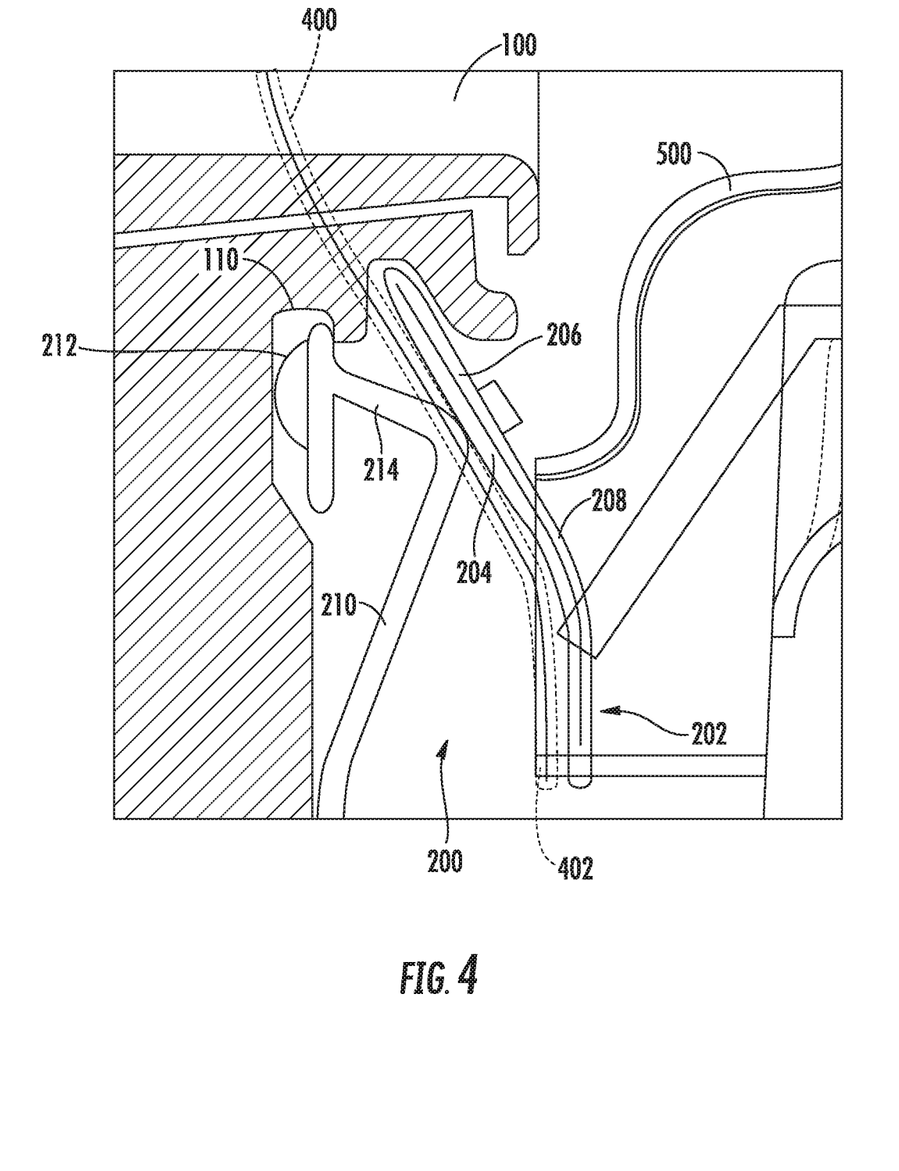
FIG. 4 is a section view of an exemplary sealing arrangement according to at least one embodiment.

FIG. 4 illustrates an exemplary circumferentially-oriented seal, which in some embodiments such as the example illustrated in FIG. 4, may be an inner seal 200, comprising a flexible sealing element 202 and a rigid frame 210. In some embodiments, the flexible sealing element 202 may include an intermediate portion 204, a first outer portion 206 on one side of the intermediate portion 204, and a second outer portion 208 on the other side of the intermediate portion 204. The flexible sealing element 202 can be held in the middle (e.g., at intermediate portion 204) while being free to flex and move on both ends (e.g., at the first outer portion 206 and the second outer portion 208). The intermediate portion 204 may thereby be mechanically loaded against the stage-one nozzle 500 and the aft frame 100. For example, in some embodiments such as that illustrated in FIG. 4, the flexible sealing element 202 may be welded to rigid frame 210 at intermediate portion 204 of flexible sealing element 202. As illustrated in FIG. 4, in some embodiments rigid frame 210 may include a D-seal 212 biasing against the aft frame 100 and a bend 214 which shifts the flexible sealing element 202 axially forward to bias, i.e., load against the stage-one nozzle 500.

As illustrated in FIG. 2, the connection between the transition duct 32 and turbine 18 is within high pressure plenum 34. As result, in some embodiments, e.g., as illustrated in FIG. 4, where the first outer portion 206 and the second outer portion 208 are unconstrained, i.e., are not mechanically fastened to the rigid frame 210, pressurized air 26 (see, e.g., FIG. 2) may bias both the first outer portion 206 and the second outer portion 208 into sealing engagement with the stage-one nozzle 500 and the aft frame 100, i.e., the first outer portion 206 and the second outer portion 208 are pressure-loaded against the aft frame 100 and the stage-one nozzle 500.

In other embodiments, the circumferentially-oriented seal illustrated in FIG. 4 as an inner seal 200 may also or instead be an outer seal 300 with similar features.

Circumferentially-oriented seals 200 and 300, such as for example inner seal 200 illustrated in FIG. 4 and/or outer seal 300 illustrated in FIGS. 5-10, and in particular the flexible sealing elements 202/302 thereof, may be composed primarily of a cloth material, which can be a woven mesh cloth of a suitable metal material, e.g., alloy L605. The materials of the flexible sealing element 202 may be layered, e.g., a single sheet of cloth material may be folded over on itself as illustrated in FIG. 4, and/or multiple layers of cloth material may be welded together.

Figure 10:
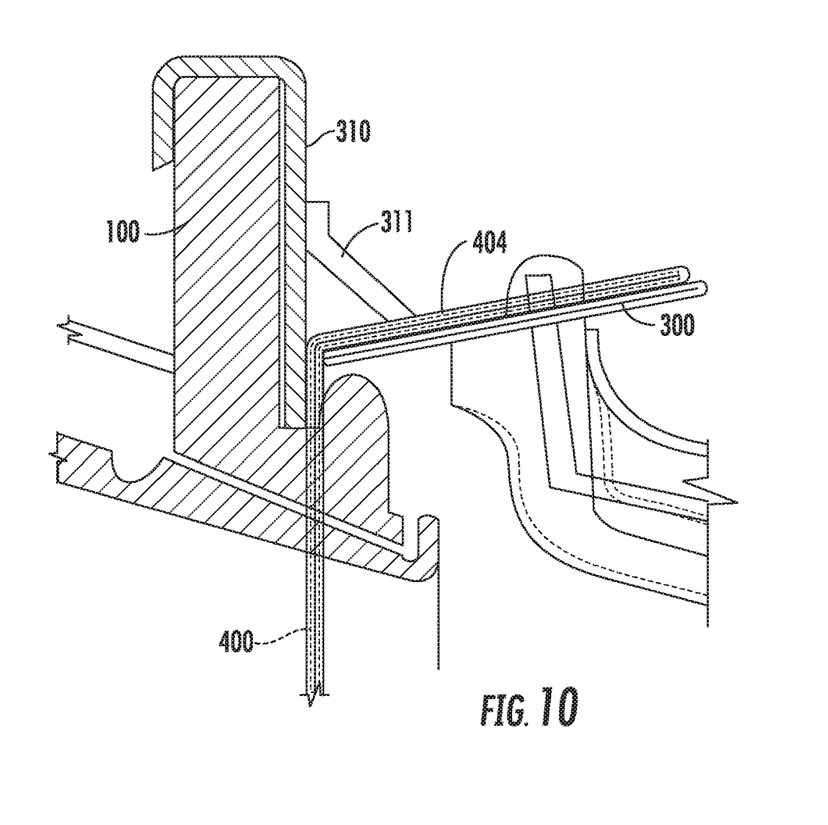
FIG. 10 is a section view of an exemplary sealing arrangement according to at least one embodiment.

In some embodiments, for example as illustrated in FIGS. 4 and 10, the circumferentially oriented seal 200 or 300 may be a first seal and a second seal, which can be radially oriented such as side seal 400 may also be provided. The side seal 400 may include an extension 402 and/or 404 extending radially beyond the aft frame 100. For example as illustrated in FIG. 4, side seal 400 may include extension 402 extending radially inward beyond the aft frame 100, such that extension 402 can be biased against the inner seal 200, e.g., by the pressure of compressed air 26 within high pressure plenum 34. Another example is illustrated in FIG. 10, where side seal 400 may also include an extension 404 instead of or in addition to extension 402, with extension 404 extending radially outward beyond the aft frame 100, such that extension 404 can be biased against the outer seal 300, e.g., by the pressure of compressed air 26 within high pressure plenum 34. That is, while the side seal 400 may be generally constrained within notches 110 (or otherwise within side seal slots) on adjacent aft frames 100, one or more extensions 402 and/or 404 may be provided which extend beyond the side seal slots (or side portions of notches 110) such that the extensions 402 and/or 404 may be pressure-loaded.

Figure 5:
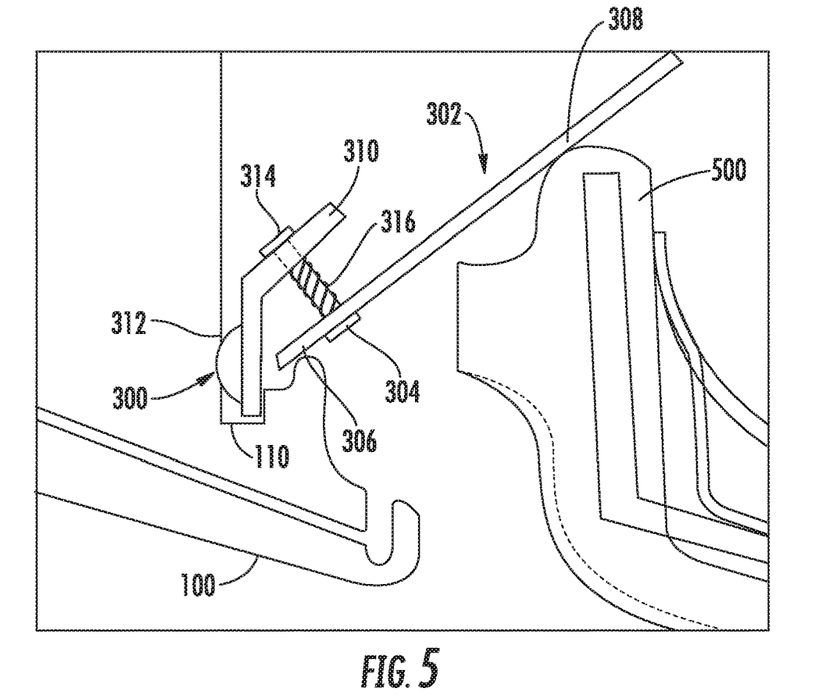
FIG. 5 is a section view of an exemplary circumferentially-oriented seal according to at least one embodiment.

As illustrated in FIG. 5, in some embodiments, the seal may be an outer seal 300. Similar to the example illustrated in FIG. 4, FIG. 5 shows an exemplary embodiment wherein outer seal 300 includes a rigid frame 310 and a flexible sealing element 302, which in turn comprises an intermediate portion 304, a first outer portion 306, and a second outer portion 308. The intermediate portion 304 of the flexible sealing element 302 is connected to the rigid frame 310, for example by a fastener 314, which may be a pin such as illustrated in FIG. 5. The intermediate portion 304 of flexible sealing element 302 may be mechanically biased against the aft frame 100 by a D-seal 312 disposed between the rigid frame 310 and the notch 110, such that the D-seal 312 biases the intermediate portion 304 of flexible sealing element 302 against the aft frame 100 indirectly via the connection between the intermediate portion 304 and the rigid frame 310. The intermediate portion 304 of flexible sealing element 302 may also be mechanically loaded against the aft frame 100 and the stage-one nozzle 500 by a biasing member such as coil spring 316 illustrated in FIG. 5. As illustrated in FIG. 5, in some embodiments where the first outer portion 306 and second outer portion 308 are unconstrained by fastener 314, pressurized air 26 (see, e.g., FIG. 2) may bias both the first outer portion 306 and second outer portion 308 into sealing engagement with the stage-one nozzle 500 and the aft frame 100, i.e., the first outer portion 306 and the second outer portion 308 are pressure-loaded against the aft frame 100 and the stage-one nozzle 500. Features of the embodiment illustrated in FIG. 5 may be incorporated in an inner seal 200 on or associated with an inner portion 102 instead of or in addition to an outer seal 300, in a similar manner as features of the embodiment illustrated in FIG. 4 may be incorporated in an outer seal 300 on or associated with an outer portion 104 instead of or in addition to an inner seal 200.

Figure 6:
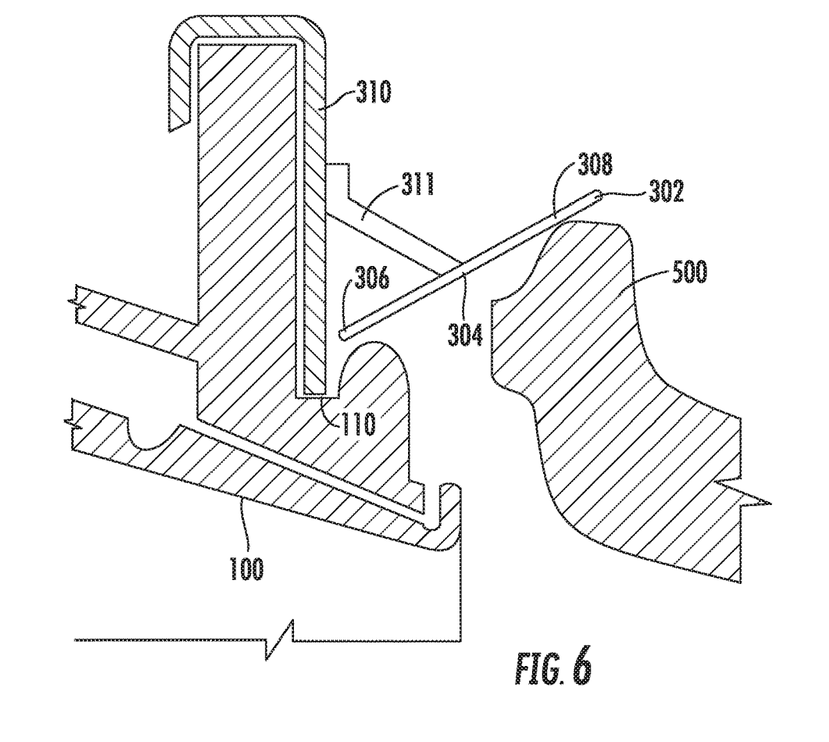
FIG. 6 is a section view of an exemplary circumferentially-oriented seal according to at least one embodiment.

Turning now to FIG. 6, an exemplary embodiment is illustrated with an outer seal 300 including a rigid frame 310 and an extension 311 of the rigid frame 310. In some embodiments such as illustrated in FIG. 6, the rigid frame extension 311 may be connected, e.g., by welding, to the intermediate portion 304 of the flexible sealing element 302 to mechanically load flexible sealing element 302 against the aft frame 100 and/or stage-one nozzle 500, in a similar fashion as the bend 214 of inner seal 200 illustrated in FIG. 4. At the same time, outer portions 306 and 308 may be pressure-loaded, e.g., under the influence of compressed air 26 within high pressure plenum 34 (compressed air 26 and high pressure plenum 34 may be seen, e.g., in FIG. 2).

Figure 7:
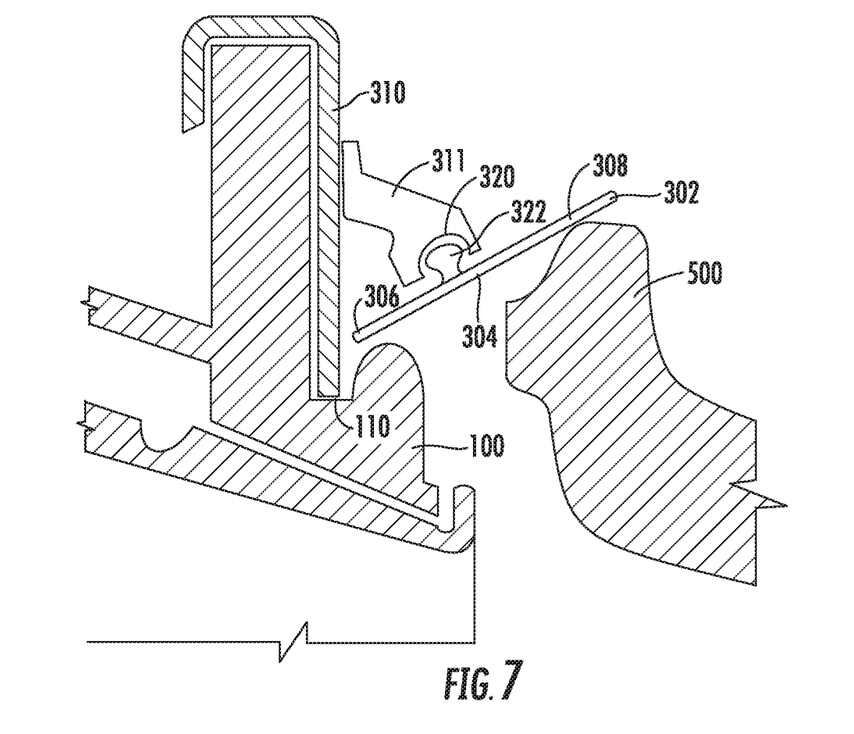
FIG. 7 is a section view of an exemplary circumferentially-oriented seal according to at least one embodiment.

FIG. 7 illustrates an exemplary embodiment wherein rigid frame 310 includes an extension 311, similar to the example of FIG. 6, discussed above. The embodiment illustrated in FIG. 7 further includes a pivot joint 320, 322 connecting the intermediate portion 304 of the flexible sealing element 302 to the rigid frame 310. As illustrated in FIG. 7, the pivot joint includes a ball 322 on the flexible sealing element 302 and a socket 320 on the rigid frame extension 311. In alternative embodiments, the ball 322 may be provided on the rigid frame extension 311 and the socket 320 may be provided on the flexible sealing element 302.

Figure 8:
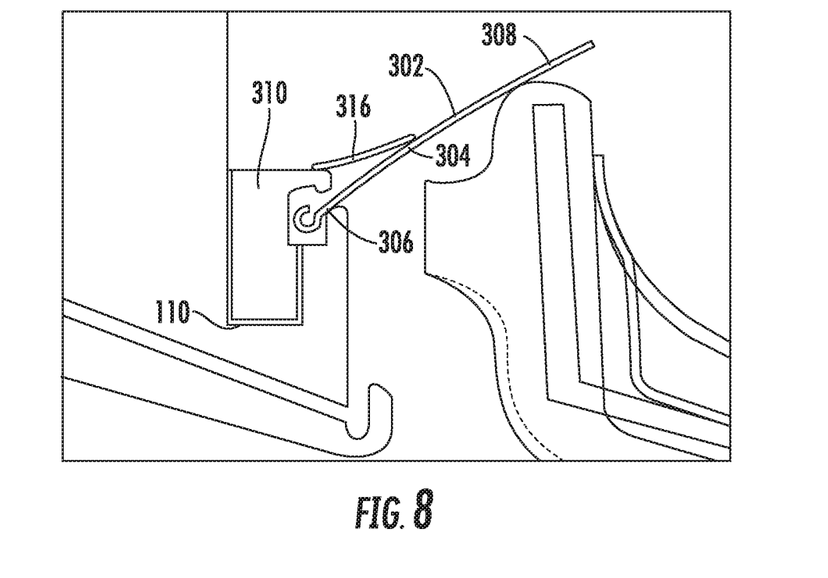
FIG. 8 is a section view of an exemplary circumferentially-oriented seal according to at least one embodiment.

FIG. 8 illustrates another exemplary embodiment wherein an outer seal includes a biasing member 316 in the form of a leaf spring 316 connecting the intermediate portion 304 of flexible sealing element 302 to the rigid frame 310 and mechanically loading the intermediate portion 304 of the flexible sealing element 302 against the first stage nozzle 500 and the aft frame 100.

Figure 9:
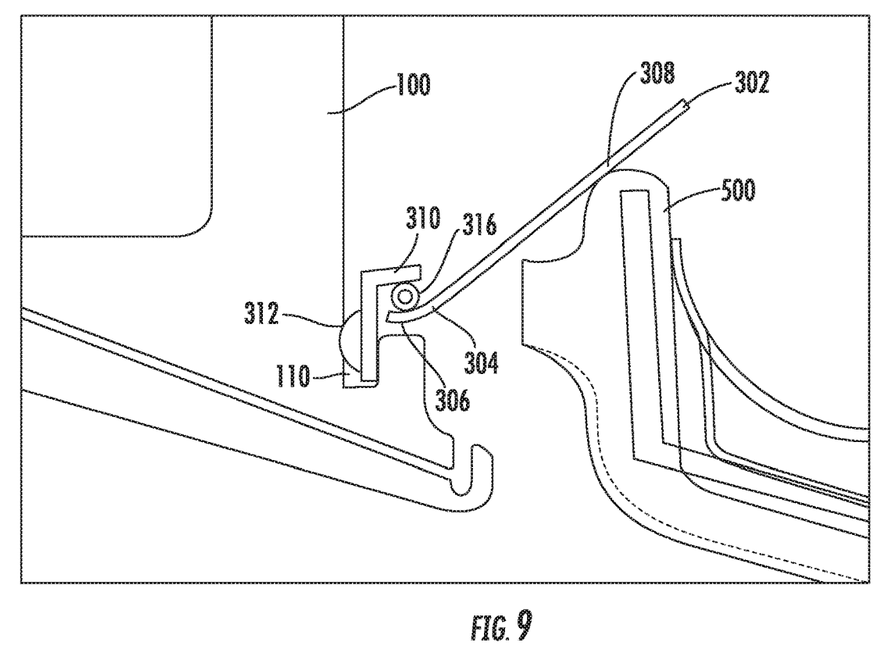
FIG. 9 is a section view of an exemplary circumferentially-oriented seal according to at least one embodiment.

FIG. 9 illustrates another exemplary embodiment wherein an outer seal includes a biasing member 316 in the form of a torsion spring 316 connecting the intermediate portion 304 of flexible sealing element 302 to the rigid frame 310 and mechanically loading the intermediate portion 304 of the flexible sealing element 302 against the first stage nozzle 500 and the aft frame 100.

FIG. 10, as discussed above, illustrates an exemplary embodiment wherein side seal 400 includes an extension 404 which extends radially outward beyond aft frame 100 such that extension 404 is unconstrained and may be pressure-loaded against outer seal 300.

Throughout the various embodiments illustrated in FIGS. 4-10, the rigid frame 210 or 310, including any sub-components thereof (e.g., bend 214 or extension 311), may be circumferentially coextensive with the corresponding inner portion 102 or outer portion 104 (the circumferential extent of inner portions 102 and outer portions 104 may be seen, e.g., in FIG. 3). Alternatively, the rigid frame 210 or 310 may be segmented, e.g., while the flexible sealing elements 202 and 302 are generally circumferentially coextensive with the corresponding inner portion 102 and outer portion 104, the rigid frame 210 or 310 may have discontinuities along the circumferential extent of inner seals 200 and outer seals 300, which may permit increased flow of compressed air 26 against the various seals 200, 300, and/or 400.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, the exemplary description in the foregoing pertaining to the inner seals can also be implemented at one or more outer seals as well as or instead of the inner seals(s), while other exemplary descriptions in the foregoing pertaining to outer seals may also be implemented at one or more inner seal instead or as well. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for sealing between a first component and a second component, the first component defining a notch, the sealing arrangement comprising:
   a rigid frame extending into the notch of the first component;
   a seal comprising a flexible sealing element having an upstream surface, the flexible sealing element comprising an intermediate portion connected to the rigid frame such that only the upstream surface of the flexible sealing element is in contact with the rigid frame, a first outer portion on one side of the intermediate portion, and a second outer portion on the other side of the intermediate portion;
   wherein the intermediate portion is mechanically loaded against the first component and the second component, and wherein the first outer portion and the second outer portion are pressure-loaded against the first component and the second component, and wherein the first component and second component do not contact one another.

2. The sealing arrangement of claim 1, wherein the intermediate portion of the flexible sealing element is welded to the rigid frame.

3. The sealing arrangement of claim 1, further comprising a pivot joint connecting the intermediate portion of the flexible sealing element to the rigid frame.

4. The sealing arrangement of claim 1, further comprising a biasing member connecting the intermediate portion of the flexible sealing element to the rigid frame.

5. The sealing arrangement of claim 4, wherein the biasing member is a leaf spring.

6. The sealing arrangement of claim 4, wherein the biasing member is a coil spring.

7. The sealing arrangement of claim 4, wherein the biasing member comprises a pin and a coil spring encircling the pin.

8. The sealing arrangement of claim 1, wherein the seal is circumferentially oriented and is a first seal, and the sealing arrangement further comprises a second seal, the second seal is radially oriented, and the second seal comprises an extension extending radially beyond the first component.

9. The sealing arrangement of claim 8, wherein the extension of the second seal is pressure-loaded against the first seal.

10. A gas turbine, comprising:
    a compressor;
    a turbine;
    a combustor;
    a transition duct which defines a flow path from the combustor to a stage-one nozzle of the turbine, the transition duct comprising an upstream end, a downstream end, and an aft frame that circumferentially surrounds the downstream end of the transition duct, wherein the aft frame includes a notch that extends around at least a portion of a perimeter of the aft frame; and
    a seal between the aft frame and the stage-one nozzle, the seal comprising a flexible sealing element having an upstream surface, the flexible sealing element comprising an intermediate portion, a first outer portion on one side of the intermediate portion, and a second outer portion on the other side of the intermediate portion;

a rigid frame mounted on the aft frame, the intermediate portion of the flexible sealing element connected to the rigid frame such that only the upstream surface of the flexible sealing element is in contact with the rigid frame, wherein the rigid frame extends radially into the notch;

wherein the intermediate portion is mechanically biased into sealing engagement with the stage-one nozzle and the aft frame, the first outer portion is configured to sealingly engage with the aft frame under a pressure from a compressed working fluid produced by the compressor, and the second outer portion is configured to sealingly engage with the stage-one nozzle under the pressure from the compressed working fluid produced by the compressor.

11. The gas turbine of claim 10, wherein the intermediate portion of the flexible sealing element is welded to the rigid frame.

12. The gas turbine of claim 10, further comprising a pivot joint connecting the intermediate portion of the flexible sealing element to the rigid frame.

13. The gas turbine of claim 10, further comprising a biasing member connecting the intermediate portion of the flexible sealing element to the rigid frame.

14. The gas turbine of claim 13, wherein the biasing member is a leaf spring.

15. The gas turbine of claim 13, wherein the biasing member is a coil spring.

16. The gas turbine of claim 13, wherein the biasing member comprises a pin and a coil spring encircling the pin.

17. The gas turbine of claim 10, wherein the seal is circumferentially oriented and is a first seal, and wherein the gas turbine further comprises a second seal, the second seal is radially oriented, and the second seal comprises an extension extending radially beyond the aft frame.

18. The gas turbine of claim 17, wherein the extension of the second seal is configured to sealingly engage with the first seal under the pressure from the compressed working fluid produced by the compressor.

19. The gas turbine of claim 10, wherein the rigid frame comprises a bend that extends axially forward and shifts the flexible sealing element axially forward to bias against the stage-one nozzle.

20. The gas turbine of claim 19, wherein the intermediate portion of the flexible sealing element is directly connected to the bend of the rigid frame.

* * * * *